United States Patent
Kimoto (10) Patent No.: US 12,365,088 B2
(45) Date of Patent: Jul. 22, 2025

(54) SELF-INTERFERENCE DETERMINATION DEVICE

(71) Applicant: FANUC CORPORATION, Yamanashi (JP)

(72) Inventor: Yuuki Kimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 270 days.

(21) Appl. No.: 18/042,219

(22) PCT Filed: Nov. 11, 2021

(86) PCT No.: PCT/JP2021/041614
§ 371 (c)(1),
(2) Date: Feb. 20, 2023

(87) PCT Pub. No.: WO2022/107683
PCT Pub. Date: May 27, 2022

(65) Prior Publication Data
US 2023/0321832 A1    Oct. 12, 2023

(30) Foreign Application Priority Data

Nov. 18, 2020    (JP) ................. 2020-191881

(51) Int. Cl.
*B25J 9/16*    (2006.01)

(52) U.S. Cl.
CPC ............ *B25J 9/1676* (2013.01); *B25J 9/163* (2013.01)

(58) Field of Classification Search
CPC ........ B25J 9/1676; B25J 9/1666; B25J 9/163; B25J 13/089
See application file for complete search history.

(56) References Cited

U.S. PATENT DOCUMENTS

| 5,561,742 A * | 10/1996 | Terada .................. B25J 9/1669 |
| | | 700/258 |
| 10,576,629 B2 * | 3/2020 | Rohmer ................ B25J 9/1676 |
| 11,285,606 B2 * | 3/2022 | Nakayama ............ B25J 9/1666 |
| 2015/0328776 A1 | 11/2015 | Shiratsuchi |

FOREIGN PATENT DOCUMENTS

| JP | H1224811 A | 9/1989 |
| JP | 2008279524 A | 11/2008 |
| JP | 2009-274148 A | 11/2009 |
| JP | 201052114 A | 3/2010 |
| JP | 2011131303 A | 7/2011 |
| JP | 2018134703 A | 8/2018 |
| JP | 2019198914 A | 11/2019 |
| WO | 2008031664 A1 | 3/2008 |
| WO | 2014122995 A1 | 8/2014 |

* cited by examiner

*Primary Examiner* — Dalena Tran
(74) *Attorney, Agent, or Firm* — HAUPTMAN HAM, LLP (57) ABSTRACT

This self-interference determination device is provided with a link shape correction unit that corrects link shapes on the basis of a specified distance between link shapes at which links of a robot comprising a plurality of links are regarded as having undergone self-interference, and a shape interference determination unit that determines the presence or absence of self-interference on the basis of the link shapes.

12 Claims, 8 Drawing Sheets

SELF-INTERFERENCE DETERMINATION DEVICE

RELATED APPLICATIONS

The present application is a National Phase of International Application No. PCT/JP2021/041614 filed Nov. 11, 2021, which claims priority to Japanese Application No. 2020-191881, filed Nov. 18, 2020.

FIELD

The present invention relates to a robot control technology, and in particular, relates to a self-interference determination device for determining self-interference of a robot having a complex shape or axial structure.

BACKGROUND

In robots comprising a plurality of links, self-interference in which one link collides with another link may occur when the links are operated. The robot is controlled so that self-interference does not occur, and the position or angle of the link at the time of self-interference can be determined by a predetermined self-interference formula. However, in robots with complex shapes or axial structures, the conventional self-interference formula for determining the presence or absence of self-interference only from the position or angle of a specified link regardless of the position or angle of links other than the specified link cannot easily respond to all conditions. Furthermore, attempting to adapt the self-interference formula may result in severe limitation of the movement range of the robot. The number of conditional branches in the formula may become too large to be practical. As a prior art for determining self-interference of a robot, the following literature is known.

Patent Literature 1 discloses an interference determination device for an articulated robot. The interference determination device comprises an acquisition unit configured to acquire region information indicating regions that are set in a configuration space in which angles of rotation of two or three specific joints of the articulated robot are indicated by coordinate axes, the regions comprising an interference region in which the articulated robot always interferes with itself regardless of the angle of rotation of a joint other than the specific joints, and a non-interference region in which the articulated robot never interferes with itself regardless of the angles of rotation of the joint other than the specific joints, and a determination unit configured to determine whether or not the articulated robot interferes with itself by determining whether coordinates indicating a posture that is determined by the angles of rotation of the specific joints belong to the interference region or the non-interference region. When the coordinates belong to a detailed determination region which does not belong to either the interference region or the non-interference region, the determination unit determines whether or not the robot interferes with itself based on the shapes of a plurality of links.

Patent Literature 2 discloses a robot interference checking device. The interference checking device checks the presence or absence of interference possibility between a plurality of components of a robot. The interference checking device comprises a primary interference determination unit which determines the presence or absence of interference possibility between primary approximation elements in a first model expressed as a primary approximation element including each of a plurality of components; and a secondary interference determination unit which determines the presence or absence of interference possibility between secondary approximation elements in a second model expressed as a secondary approximation element which is equal to or less than the primary approximation element.

CITATION LIST

Patent Literature

[PTL 1] Japanese Unexamined Patent Publication (Kokai) No. 2019-198914
[PTL 2] Japanese Unexamined Patent Publication (Kokai) No. 2011-131303

SUMMARY

Technical Problem

The present invention has been conceived in light of the problems of the prior art, and aims to provide a technology with which the presence or absence of self-interference can be determined even for robots having a complex shape or shaft structure for which the presence or absence of self-interference cannot be determined based only on the position or angle of the specified link regardless of the positions or angles of links other than a specified link.

Solution to Problem

An aspect of the present disclosure provides a self-interference determination device, comprising a link shape correction unit which corrects a link shape based on a specified distance between link shapes in which links of a robot comprising a plurality of links are considered to be a self-interference, and a shape interference determination unit which determines the presence or absence of self-interference based on the link shape.

Another aspect of the present disclosure provides a self-interference determination device, comprising a shape interference determination unit which determines, for an indeterminable link for which the presence or absence of self-interference cannot be determined from only a position or angle of a specified link of a robot comprising a plurality of links, regardless of the position or angle of links other than the specified link, the presence or absence of the self-interference based on whether or not link shapes are closer to each other than the specified distance.

Another aspect of the present disclosure provides a self-interference determination device, comprising a self-interference formula definition unit which defines a self-interference formula for determining a possibility of self-interference of a robot comprising a plurality of links, and a self-interference formula determination unit which determines the possibility of self-interference based on the self-interference formula, wherein the self-interference formula definition unit defines, for an indeterminable link for which the presence or absence of the self-interference cannot be determined from only a position or angle of a specified link regardless of the positions or angles of links other than the specified link, the self-interference formula based on a shape including a movable region of all links from the indeterminable link on a base side of the robot to the indeterminable link on a tip side of the robot.

Yet another aspect of the present invention provides a self-interference determination device for determining self-interference of a first link and a second link, comprising an indeterminable link determination unit which determines whether or not one of the first link and the second link is an indeterminable link for which the presence or absence of self-interference cannot be determined from only a position or angle of the link when the first link and the second link are considered to be a self-interference, and an interference determination unit which determines self-interference of the indeterminable link based on the determination results.

Advantageous Effects of Invention

According to the aspects of the present disclosure, the presence or absence of self-interference can be determined even for robots having a complex shape or shaft structure for which the presence or absence of self-interference cannot be determined based only on the position or angle of the specified link regardless of the positions or angles of links other than a specified link.

DESCRIPTION OF EMBODIMENTS

The embodiments of the present disclosure will be described in detail below with reference to the attached drawings. In the drawings, the same or similar constituent elements are assigned the same or similar reference signs. Furthermore, the embodiments described below do not limit the technical scope of the invention described in the claims or the definitions of terms. Note that as used herein, the term "link" means a connecting member for single-axis robots or multi-axis robots. For example, a "link" includes not only the arm portion of a robot, but also the tool portion, such as a hand, screwdriver, or welding gun. As used herein, the term "self-interference" means that links interfere with each other. Furthermore, as used herein, the term "interference" includes not only contact between objects but also intersection between objects in terms of calculation of shape interference determination based on link shapes. As used herein, the term "rotation" means both forward rotation and reverse rotation.

Figure 1:
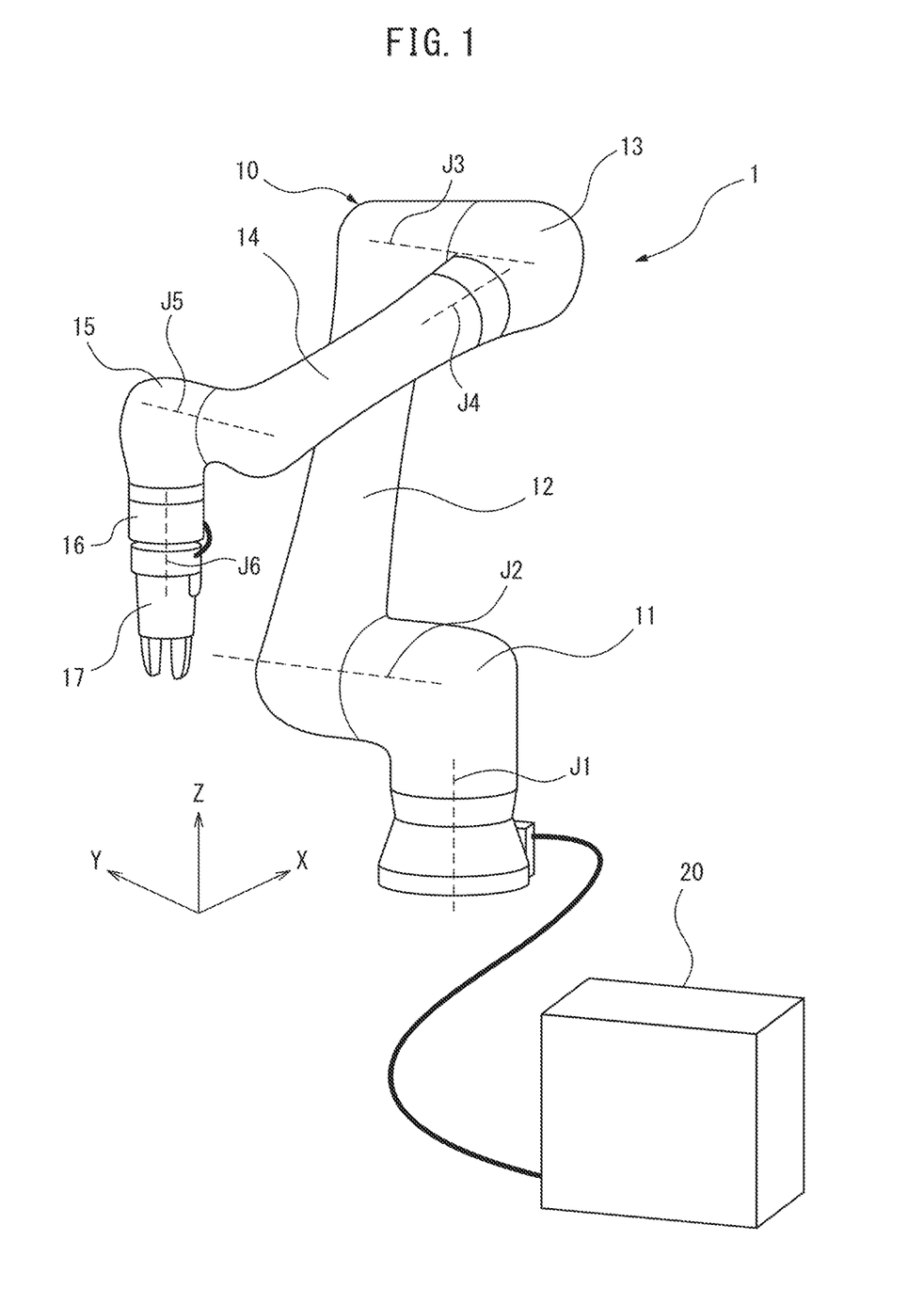
FIG. 1 is a schematic configuration view of a robot system according to an embodiment.

First, the configuration of the robot system of the present embodiment will be described. FIG. 1 is a schematic configuration view of a robot system 1. The robot system 1 comprises a robot 10 which comprises a plurality of links, and a self-interference determination device 20 which determines the presence or absence of self-interference. The robot 10 is, for example, a collaborative robot having a complex shape or shaft structure. The robot 10 has a first link 11, a second link 12, a third link 13, a fourth link 14, a fifth link 15, a sixth link 16, and a seventh link 17. For example, the first to sixth links 11 to 16 are arm parts of the robot 10, and the seventh link 17 is a tool part (for example, a hand). The plurality of links are connected in series.

The first to sixth links 11 to 16 are connected to each other by gears such as speed reducers. The sixth link 16 and the seventh link 17 are fastened with screws such as bolts. The first link 11 rotates about axis J1, the second link 12 rotates about axis J2, the third link 13 rotates about axis J3, the fourth link 14 rotates about axis J4, the fifth link 15 rotates about axis J5, and the sixth link 16 and seventh link 17 rotate together about axis J6. The first to seventh links 11 to 17 are driven by drive sources (not illustrated) such as servomotors.

This robot 10 has a complex shape or shaft structure in which the center of rotation of other links (for example, the third to seventh links 13 to 17) are not present on a virtual plane (for example, the XZ plane or YZ plane) containing the axis J1 of the first link 11. Since the third link 13 rotates 360 degrees about the axis J3 and the fourth link 14 rotates 360 degrees about the axis J4, there is a possibility that the fifth to seventh links 15 to 17, which are closer to the tip side of the robot 10 than the fourth link 14, will interfere with the first link 11 or the second link 12.

Conversely, for example, since a general vertically-articulated robot has a simple shape or shaft structure in which the center of rotation of the other link are present in a virtual plane containing the axis J1 of the first link, the presence or absence of self-interference can be easily determined using a self-interference formula for determining the same only by the position or angle of a specified link regardless of the position or angle of links other than the specified link. However, in the robot 10 having a complicated shape or axial structure as depicted in FIG. 1, it cannot be determined whether the fifth link 15, sixth link 16, and seventh link 17 self-interfere with the first link 11 or the second link 12 only from the position or angle of the specified link. The self-interference determination device 20 can determine the presence or absence of self-interference in this manner even in such a robot 10 having a complicated shape or shaft structure.

The self-interference determination device 20 is, for example, a robot control device. The self-interference determination device 20 may be, for example, a computer device comprising a processor, memory, and input/output units, which are not illustrated. The processor comprises, for example, a CPU (central processing unit). The memory includes, for example, RAM (random access memory) and ROM (read-only memory). For example, programs executed by the processor and various data used or generated by the processor are stored in the memory. The input/output units are used to input or output various data used or generated by the processor.

First, the self-interference determination device 20 defines a conventional self-interference formula for determining the presence or absence of self-interference from only the position or angle of a specified link for links (hereinafter referred to as "determinable links") for which the presence or absence of self-interference can be determined from only the position or angle of the specified link regardless of the positions or angles of links other than the specified link. However, it should be noted that in the robot 10 depicted in FIG. 1, there are no determinable links which have a possibility of self-interference.

The self-interference determination device 20 defines, for links (hereinafter referred to as "indeterminable links") for which the presence or absence of self-interference cannot be determined from only the position or angle of the specified link regardless of the positions or angles of links other than the specified link, a self-interference formula for determining the possibility of self-interference based on a shape including a movable region of all links from an indeterminable link (for example, the fifth link 15) on the base side of the robot 10 to an indeterminable link (for example, the seventh link 17) on the tip side of the robot 10. For example, in the robot 10 depicted in FIG. 1, the fifth to seventh links 15 to 17 are indeterminable links, and a self-interference formula is defined based on the shape encompassing the movement range of all the links from the fifth link 15 on the base side of the robot to the seventh link 17 on the tip side of the robot. The self-interference determination device 20 roughly determines the possibility of self-interference based on the self-interference formula (hereinafter referred to as "self-interference formula determination" or "rough determination").

Though the self-interference determination device 20 can determine the presence or absence of self-interference for a determinable link using a self-interference formula, for indeterminable links, the presence or absence of self-interference is determined in detail based on whether the link shapes are closer to each other than the specified distance (hereinafter referred to as "shape interference determination" or "detailed determination"). For example, in the robot 10 depicted in FIG. 1, detailed determination is performed based on the shape interference determination for the fifth to seventh links 15 to 17, which are indeterminable links. As a result, restriction of the movement range of the robot 10 can be prevented. Specifically, the self-interference determination device 20 has a hybrid determination function of rough determination based on self-interference formula determination and detailed determination based on shape interference determination.

Figure 2:
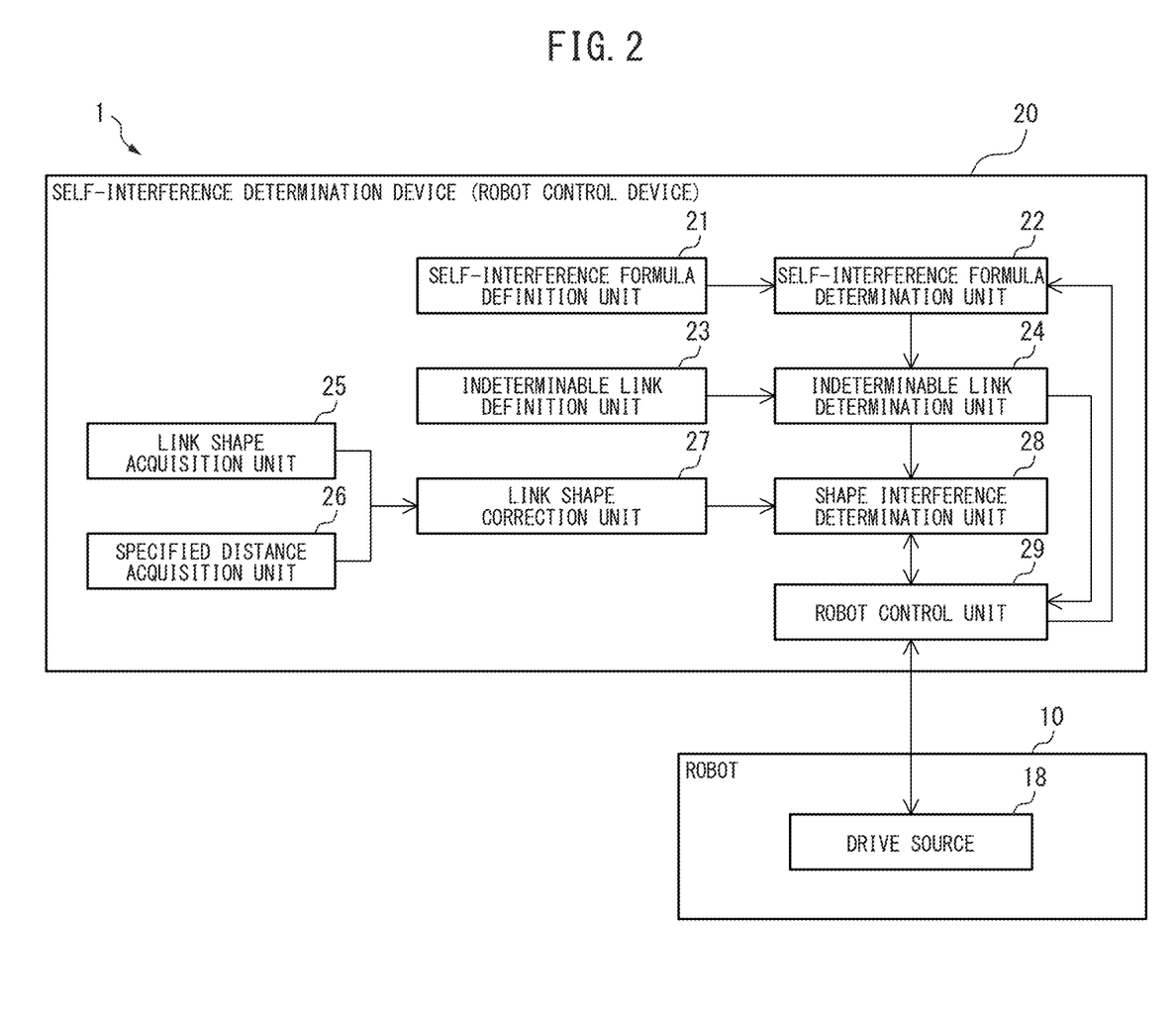
FIG. 2 is a functional block diagram of a robot system according to an embodiment.

FIG. 2 is a functional block diagram of the robot system 1. It should be noted that the "units" of the self-interference determination device 20 are functional modules realized by, for example, programs executed by a processor. The self-interference determination device 20 comprises a self-interference formula definition unit 21, a self-interference formula determination unit 22, and a robot control unit 29. The self-interference formula definition unit 21 defines a self-interference formula for determining the possibility of self-interference by the robot 10, and the self-interference formula determination unit 22 determines the possibility of self-interference based on the defined self-interference formula. The robot control unit 29 controls a drive source 18 of the robot 10, and the drive source 18 provides the current states of the links (i.e., the current positions or angles, velocities, etc.) to the robot control unit 29. The robot control unit 29 provides the current states of the links to the self-interference formula determination unit 22. The self-interference formula determination unit 22 substitutes the provided current positions or angles of the links into the self-interference formula to determine the possibility of self-interference.

Figure 3:
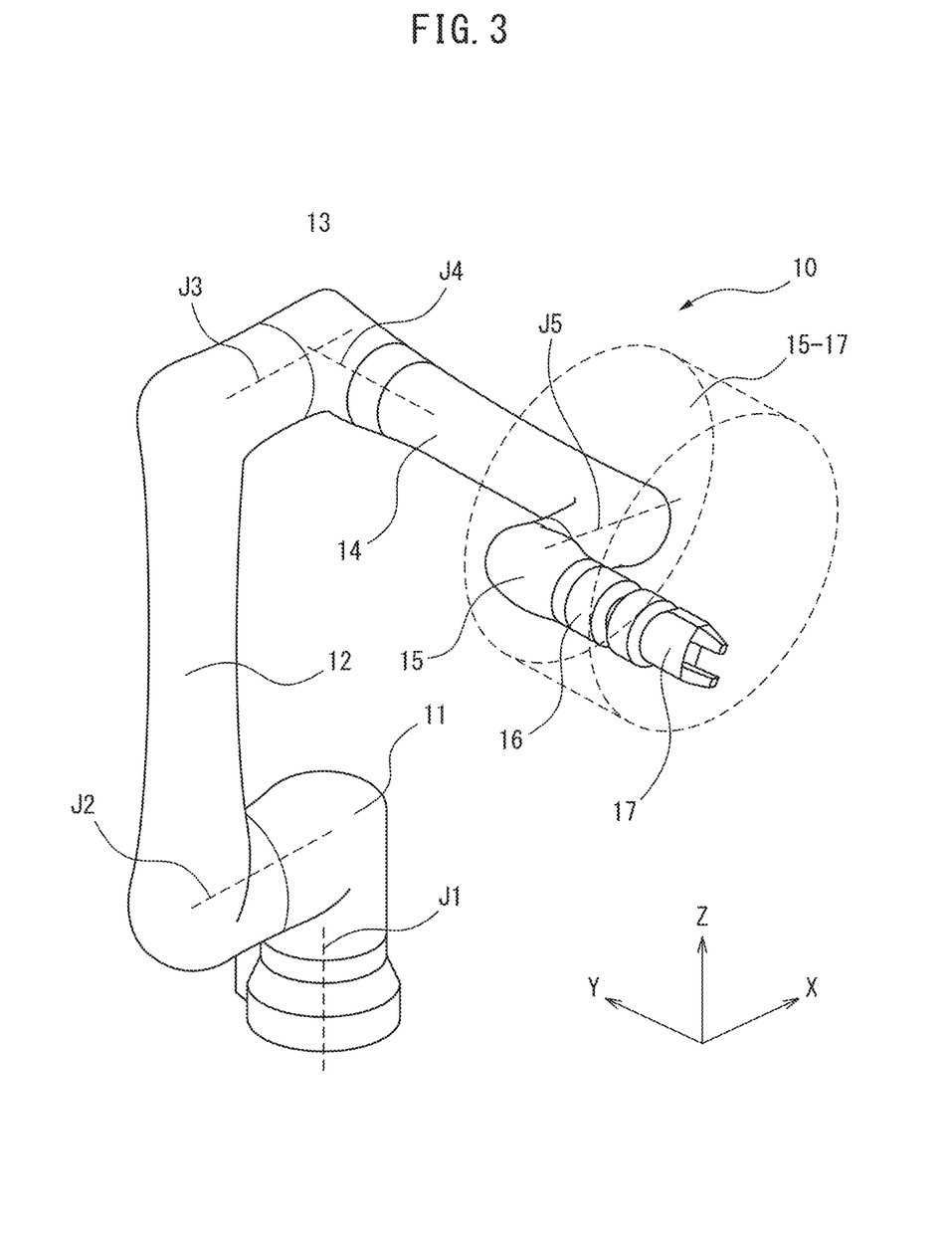
FIG. 3 is a perspective view of a robot depicting an example of a self-interference formula definition method.

FIG. 3 is a perspective view of the robot 10 depicting an example of a self-interference formula definition method. For example, when defining the self-interference formula of the fifth to seventh links 15 to 17, which are indeterminable links, the self-interference formula definition unit 21 first operates all links from the fourth link 14 more on the base side of the robot 10 than the fifth link to the seventh link 17 on the tip side of the robot 10, and defines cylinder 15-17 including movable regions of all links from the fifth link 15 on the base side of the robot 10 to the seventh link 17 on the tip side of the robot 10. The self-interference formula definition unit 21 may acquire the link shapes of the fifth to seventh links 15 to 17 from a link shape acquisition unit 25, which is described later.

Figure 4:
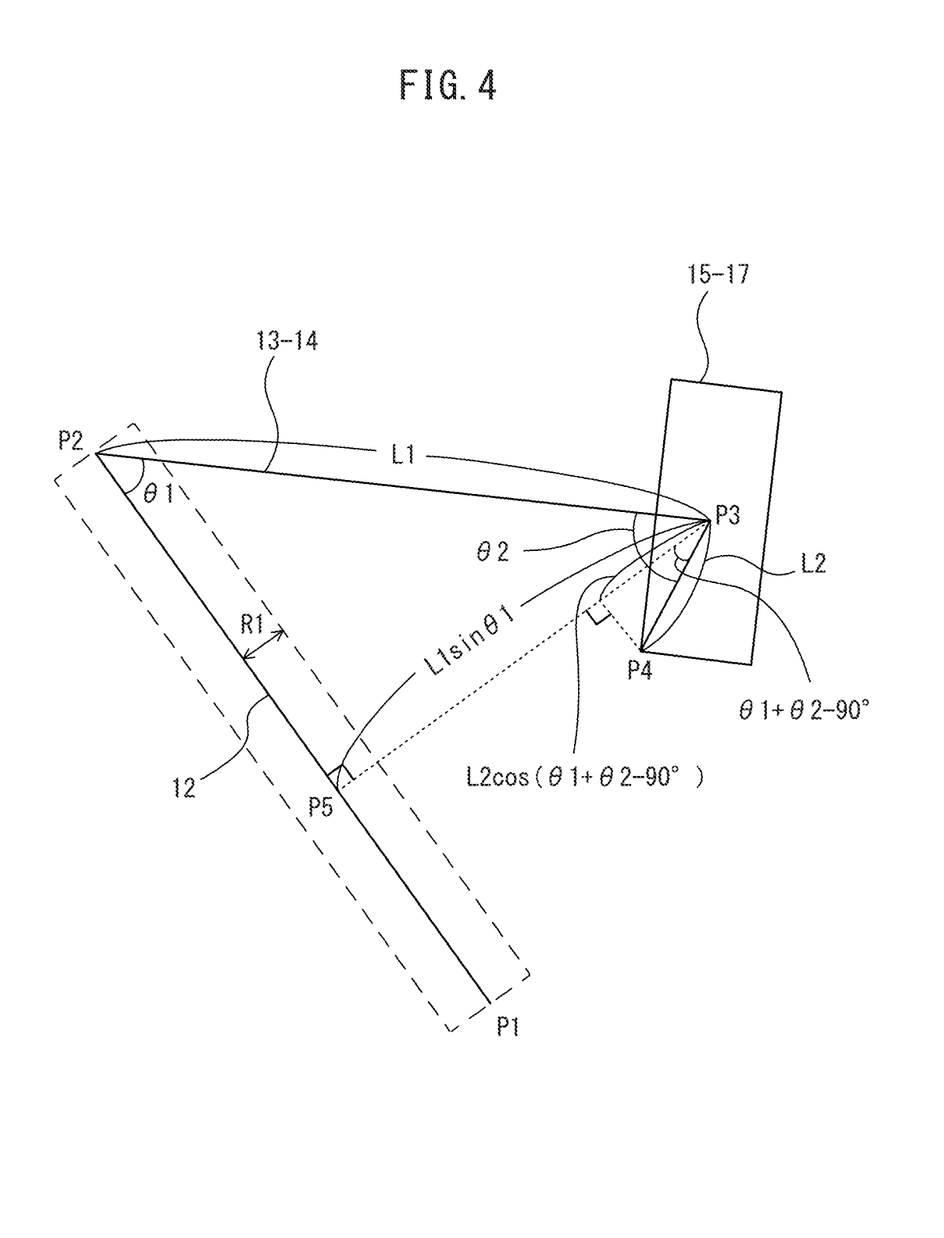
FIG. 4 is a geometric diagram of a robot depicting an example of a self-interference formula definition method.

Next, the self-interference formula definition unit 21 defines a self-interference formula for determining the possibility that the cylinder 15-17 encompassing the movable region of the fifth to seventh links 15 to 17, which are indeterminable links, will interfere with, for example, the second link 12. FIG. 4 is a geometric diagram of the robot 10 depicting an example of the self-interference formula definition method. Note that only the second link 12, third/fourth link 13-14, and cylinder 15-17 are simplified in FIG. 4 to facilitate understanding.

The base point of the second link 12 is defined as P1, the center of rotation of the third link 13 is defined as P2, the center of cylinder 15-17 is defined as P3, the nearest neighbor point of the cylinder 15-17 to the second link 12 is defined as P4, and the intersection point of the center line of the second link 12 and a perpendicular line drawn from the center P3 of the cylinder 15-17 to the center line of the second link 12 is defined as P5. The length of the line segment P2-P3 is defined as L1, the length of the line segment P3-P4 is defined as L2, the current angle of the third link 13 is defined as $\theta 1$, and the current angle of the fifth link 15 (the angle formed by the line segment P2-P3 and the line segment P3-P4) is defined as $\theta 2$.

At this time, the angle formed by the perpendicular line P3-P5 and the line segment P3-P4 is $\theta 1 + \theta 2 - 90°$, and thus, the size of the cylinder 15-17 toward the second link 12 can be expressed as $L2 \cos(\theta 1 + \theta 2 - 90°)$. The size of the second link 12 toward the cylinder 15-17 is defined as R1. The distance between the cylinder 15-17 and the second link 12 can be expressed as $L1 \sin \theta 1$. Thus, when the distance $L1 \sin \theta 1$ between the cylinder 15-17 and the second link 12 is less than or equal to the sum of the size $L2 \cos(\theta 1 + \theta 2 - 90°)$ of the cylinder 15-17 toward the second link 12 and the size R1 toward the cylinder 15-17 of the second link 12, there is a possibility that the cylinder 15-17 (i.e., the fifth to seventh links 15 to 17, which are indeterminable links) will interfere with the second link 12. Specifically, the self-interference formula for determining the possibility that the indeterminable links (the fifth to seventh links 15 to 17) self-interfere with the second link 12 can be expressed as follows.

[Math 1]

$$L1 \sin \theta 1 \le L2 \cos(\theta 1 + \theta 2 - 90°) + R1 \qquad (1)$$

Since L1, L2, and R1 are constants, when the current angle $\theta 1$ of the third link 13 and the current angle $\theta 2$ of the fifth link 15 are substituted into the self-interference formula of formula 1, the possibility that the indeterminable links (fifth to seventh links 15 to 17) will self-interfere with the second link 12 can be determined. The self-interference formula definition unit 21 defines self-interference formulas for other combinations of links which have a possibility of self-interference (for example, the fifth to seventh links 15 to 17 and the first link 11) based on the same principle.

Referring again to FIG. 2, the robot control unit 29 provides the current states of the links (i.e., the current positions or angles) to the self-interference formula determination unit 22. The self-interference formula determination unit 22 substitutes the current states of the links into the self-interference formulas to determine whether there is a possibility of self-interference. For example, the self-interference formula determination unit 22 performs self-interference formula determination (rough determination) by substituting the current angle θ1 of the third link 13 and the current angle θ2 of the fifth link 15 into the self-interference formula of formula 1.

The self-interference determination device 20 preferably further comprises an indeterminable link definition unit 23 and an indeterminable link determination unit 24. The indeterminable link definition unit 23 defines indeterminable links which have a possibility of self-interference, and the indeterminable link determination unit 24 determines whether the indeterminable links actually have a possibility of self-interference.

The indeterminable link definition unit 23 defines, for example, the fifth to seventh links 15 to 17 as indeterminable links. Specifically, the fifth to seventh links 15 to 17 are indeterminable links which have a possibility of self-interference with the first link 11 or the second link 12, and the presence or absence of self-interference cannot be determined from only the positions or angles of these links. In other words, the fifth to seventh links 15 to 17 are links having centers of rotation which are not present on the virtual plane including the axis J1 of the first link 11.

The indeterminable link determination unit 24 determines whether the fifth to seventh links 15 to 17, which are indeterminable links, actually have a possibility of a self-interference with the first link 11 or the second link 12. Specifically, the indeterminable link determination unit 24 determines whether or not a link determined to have a possibility of self-interference by the self-interference formula determination unit 22 is a defined indeterminable link (fifth to seventh links 15 to 17).

When the link determined to have a possibility of self-interference by the self-interference formula is not a defined indeterminable link, but rather is a determinable link, since it is a link for which the presence or absence of self-interference can accurately be determined with the self-interference formula, the indeterminable link determination unit 24 transmits a command to stop the robot 10 to the robot control unit 29. The robot control unit 29 stops the drive source 18 of the robot 10 based on the stop command.

Alternatively, when the link determined to have a possibility of self-interference by the self-interference formula is a defined indeterminable link, since the presence or absence of self-interference cannot accurately be determined with the self-interference formula, the indeterminable link determination unit 24 transmits a shape interference determination command to a shape interference determination unit 28. The self-interference determination device 20 further comprises a link shape acquisition unit 25, a specified distance acquisition unit 26, a link shape correction unit 27, and a shape interference determination unit 28.

The link shape acquisition unit 25 acquires the link shapes, the specified distance acquisition unit 26 acquires the specified distance between the link shapes considered to interfere with each other, the link shape correction unit 27 corrects the link shapes based on the specified distance, and the shape interference determination unit 28 makes a detailed determination of the presence or absence of self-interference based on whether or not the link shapes are closer than the specified distance. The robot control unit 29 provides the current states of the links (i.e., the current positions or angles, velocities, etc.) to the shape interference determination unit 28. The shape interference determination unit 28 computes the current positions and postures of the link shapes from the provided current positions or angles of the links.

The link shape acquisition unit 25 acquires the link shapes of, for example, the first link 11, the second link 12, the fifth link 15, the sixth link 16, and the seventh link 17, which have a possibility of self-interference. Alternatively, the link shape acquisition unit 25 may acquire all link shapes of the first to seventh links 11 to 17. For example, the link shapes may be three-dimensional data such as three-dimensional CAD (computer-aided design) data and three-dimensional polygon data. The link shape acquisition unit 25 acquires the link shapes from, for example, a memory or an external device.

The specified distance acquisition unit 26 acquires, for example, a specified distance of 50 mm between the link shapes for the second link 12 and the fifth link 15, which are considered to self-interfere. As a result, when the second link 12 and the fifth link 15 approach each other within the specified distance of 50 mm or less, it is assumed that self-interference will occur, and the robot 10 can be stopped. Alternatively, the specified distance may be specified as a range, in which case the specified distance acquisition unit 26 acquires, for example, a range of 50 mm to 70 mm between the link shapes for the second link 12 and the fifth link 15, which are considered to self-interfere. As a result, when the second link 12 and the fifth link 15 approach each other within the specified range of 50 mm to 70 mm, it is assumed that self-interference will occur, and the robot can be stopped. The specified distance acquisition unit 26 acquires the specified distance from, for example, a memory or an external device.

Figure 5A:
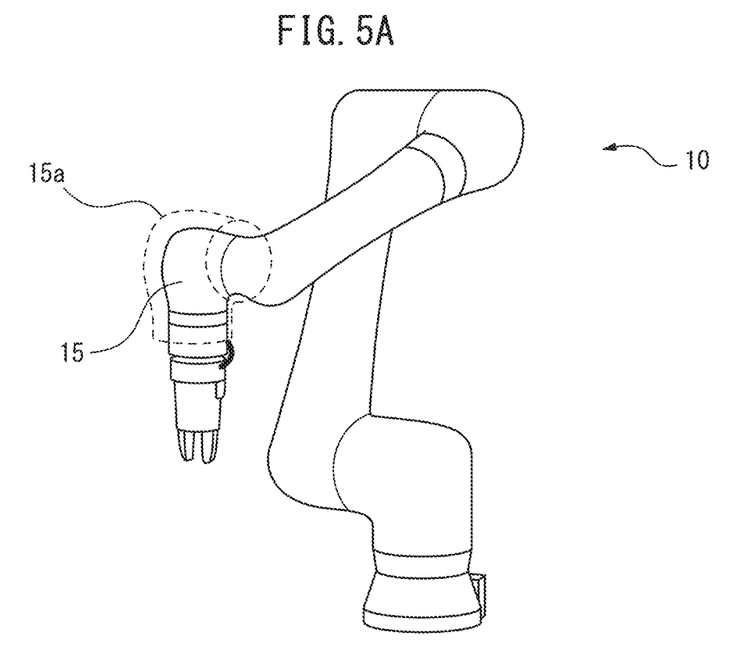
FIG. 5A is a perspective view of a robot depicting a link shape expanded by a specified distance.
Figure 5B:
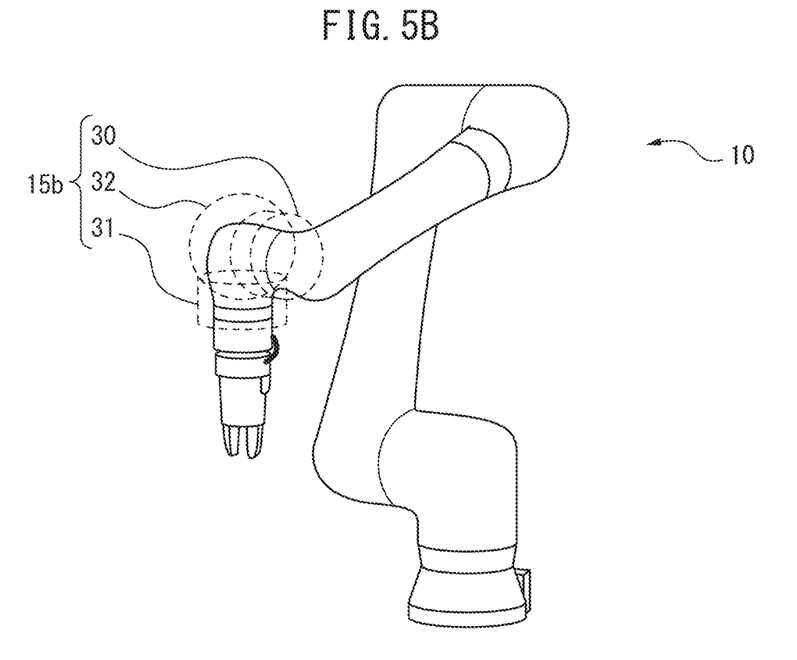
FIG. 5B is a perspective view of a robot depicting a link shape which is simplified so as to fit within a specified range.

The link shape correction unit 27 enlarges the link shape by, for example, the specified distance. FIG. 5A is a perspective view of the robot 10 depicting a link shape 15*a* which has been enlarged by the specified distance. The link shape 15*a* is obtained by enlarging the actual link shape of the fifth link 15 by the specified distance of 50 mm. Alternatively, if the specified distance is specified as a range, the link shape correction unit 27 may simplify the link shape to fit within, for example, the specified range. FIG. 5B is a perspective view of the robot 10 depicting a link shape 15*b*, which has been simplified so as to fit within the specified range. The link shape 15*b* is obtained by simplifying the actual link shape of the fifth link 15 within the specified range of 50 mm to 70 mm. The link shape 15*b* is simplified with two cylinders 30, 31 and one sphere 32. Note that the link shape may be simplified with one cylinder, one sphere, etc., as long as it falls within the specified range of 50 mm to 70 mm.

The link shape correction unit 27 also similarly enlarges the sixth link 16, seventh link 17, etc., which are other indeterminable links, by the specified distance or simplifies them so that they fit within the specified range.

Referring again to FIG. 2, the shape interference determination unit 28 determines, for example, whether the enlarged link shape 15*a* of the fifth link 15 and the link shape of the second link 12 interfere (touch or cross). For example, when three-dimensional polygon data is used, contact or intersection between polygon surfaces should be brute-force determined. For example, if one or more vertices of one polygonal surface are on the back side of another polygonal surface, and the remaining vertices are on the front side of the other polygonal surface, it can be determined that the link shapes are interfering with each other. Such shape interference determination is more computationally economical than brute-force determination of whether the distance between polygon surfaces is less than or equal to the specified distance.

Alternatively, the shape interference determination unit 28 may determine, for example, whether the simplified link shape 15*b* of the fifth link 15 and the link shape of the second link 12 interfere (touch or cross). For example, when using three-dimensional polygon data, since the simplified link shape 15*b* has an overwhelmingly smaller number of polygonal surfaces than the enlarged link shape 15*a*, shape interference determination based on simplified link shape 15*b* is more computationally economical than shape interference determination based on the enlarged link shape 15*a*.

If it is determined that there is self-interference based on such shape interference determination (detailed determination), the shape interference determination unit 28 transmits a command to stop the robot 10 to the robot control unit 29. The robot control unit 29 stops the drive source 18 of the robot 10 based on the stop command. Alternatively, if it is determined that there is no self-interference based on shape interference determination (detailed determination), the shape interference determination unit 28 either transmits a determination directive to the self-interference formula determination unit 22 to return to self-interference formula determination (rough determination) or to repeat shape interference determination (detailed determination).

Note that the self-interference determination device 20 may further comprise a robot stoppage command unit (not illustrated) which calculates the current minimum distance between link shapes and the current relative velocity between the link shapes, determines whether the robot 10 can be stopped safely (gently) based on the minimum distance and relative velocity, and transmits a safe-stop command to the robot control unit 29 when it is determined that the robot 10 can safely be stopped. The robot stoppage command unit may transmit an emergency stop command to the robot control unit 29 when it determines that the robot 10 cannot be stopped safely.

Figure 6:
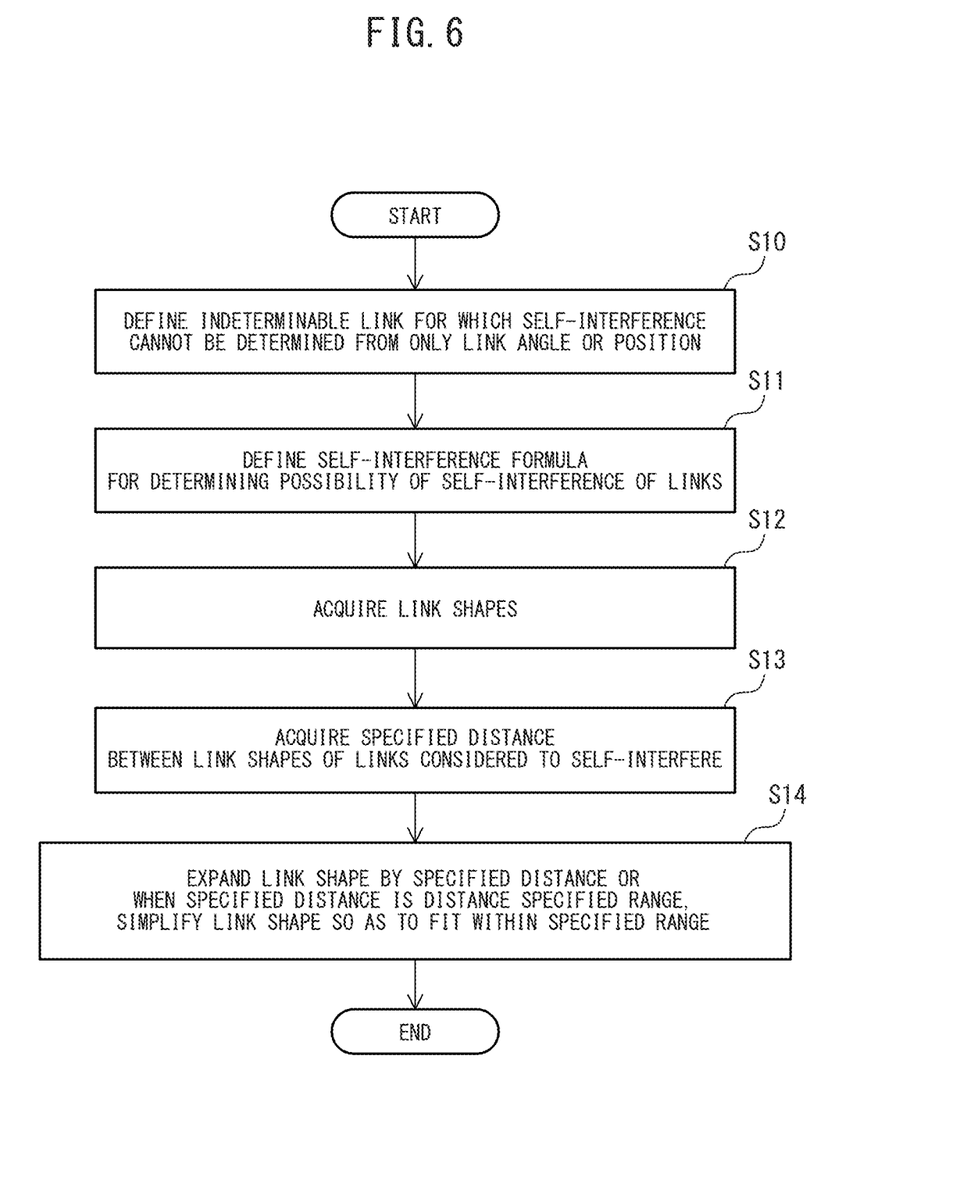
FIG. 6 is a flowchart depicting an example of preprocessing of a self-interference determination device.

FIG. 6 is a flow chart depicting an example of pre-processing of the self-interference determination device 20. This flowchart is executed by, for example, the processor of the self-interference determination device 20. In step S10, indeterminable links for which the presence or absence of self-interference cannot be determined only from the position or angle of a specific link are defined. For example, the fifth to seventh links 15 to 17, which are indeterminable links, are input by user operation via a graphical user interface (GUI).

In step S11, a self-interference formula for determining the possibility of self-interference between links is defined. For example, for determinable links, a conventional self-interference formula is defined, and for the fifth to seventh links 15 to 17, which are indeterminable links, a self-interference formula is defined based on a shape including the movable regions of all links from the fifth link 15 on the base side of the robot 10 to the seventh link 17 on the tip side of the robot 10.

In step S12, the link shapes are acquired. For example, the link shapes are input from a memory or an external device. In step S13, the specified distance between link shapes for which there is considered to be interference between the links is acquired. For example, a specified distance of 50 mm is input by user operation via the GUI. In step S14, the link shapes are corrected based on the specified distance. For example, the link shape of the fifth link 15 is enlarged by the specified distance of 50 mm, or if the specified distance is specified by a range, the link shape of the fifth link 15 is simplified so that it falls within the specified range of 50 mm to 70 mm.

Note that in the flowchart depicted in FIG. 6, the order of steps S10 and S11 and steps S12 to S14 and the order of steps S12 and S13 may be reversed.

Figure 7:
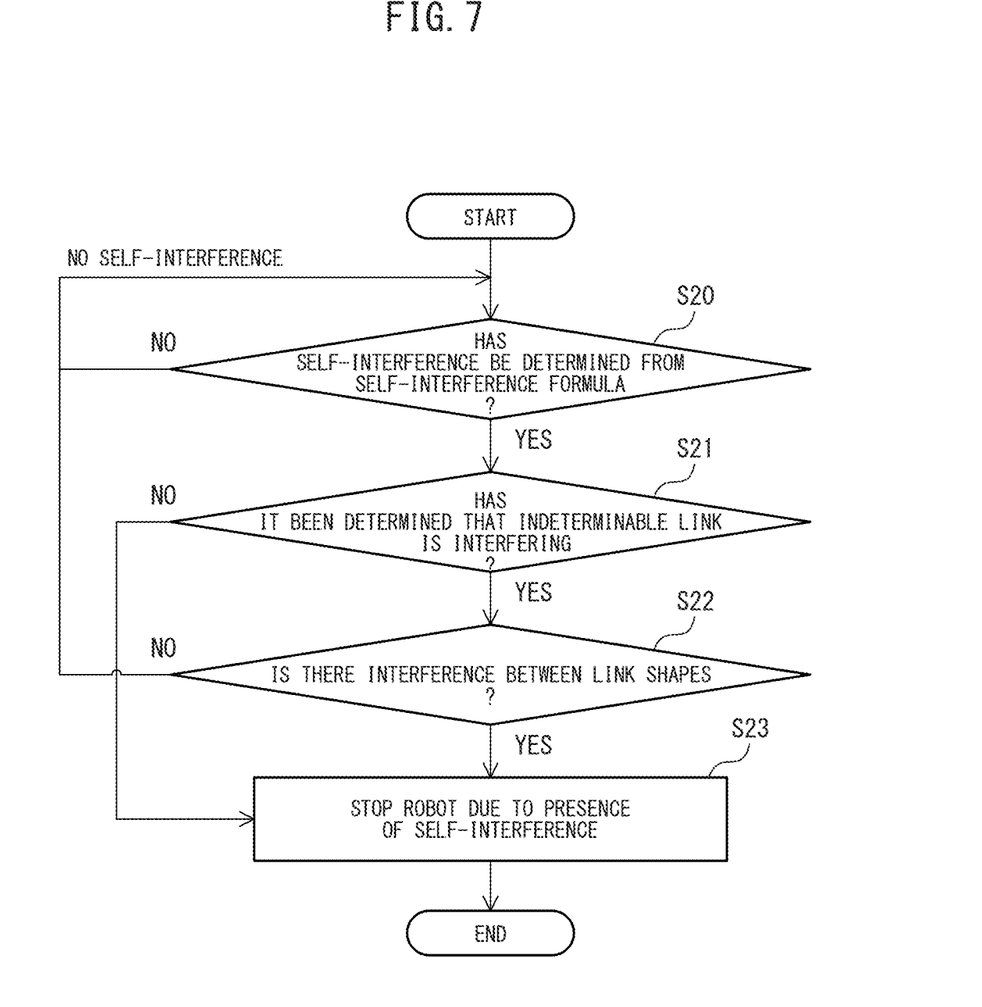
FIG. 7 is a flowchart depicting an example of determination processing of a self-interference determination device.

FIG. 7 is a flowchart depicting an example of determination processing of the self-interference determination device 20. This flow chart is executed by, for example, the processor of the self-interference determination device 20. Also note that this flow chart is executed while the robot 10 is in operation. In step S20, the possibility of self-interference is determined based on the self-interference formula (i.e., self-interference formula determination (rough determination) is performed). If the self-interference formula determines that there is no possibility of self-interference (NO in step S20), the self-interference formula determination (rough determination) in step S20 is repeated.

When it is determined from the self-interference formula that there is a possibility of self-interference (YES in step S20), in step S21, it is determined whether or not the link determined to have a possibility of self-interference from the self-interference formula is an indeterminable link. When the link determined to have a possibility of self-interference from the self-interference formula is a determinable link (NO in step S21), since there is self-interference, in step S23, the operation of the robot 10 is stopped. At this time, the current minimum distance between link shapes and the current relative velocity between link shapes may be calculated, and the robot 10 may be brought to a safe stop based on the minimum distance and relative velocity.

When the link determined to have a possibility of self-interference from the self-interference formula is an indeterminable link (YES in step S21), in step S22, the presence or absence of self-interference is determined (i.e., shape interference determination (detailed determination) is performed) based on whether or not the link shapes are closer to each other than the specified distance. For example, it is determined whether or not the link shape enlarged by the specified distance interferes (contacts or intersects) with another link shape. Alternatively, when the specified distance is specified as a range, it is determined whether or not the simplified link shape interferes (contacts or intersects) with another link shape within the specified range.

When it is determined that the link shapes do not interfere with each other (NO in step S22), the process returns to the self-interference formula determination of step S20. Alternatively, the shape interference determination of step S22 may be repeated. When it is determined that the link shapes are interfering with each other (YES in step S22), since there is self-interference, in step S23, the operation of the robot 10 is stopped. At this time, the current minimum distance between link shapes and the current relative velocity between link shapes may be calculated, and the robot may be brought to a safe stop based on the minimum distance and relative velocity.

Figure 8:
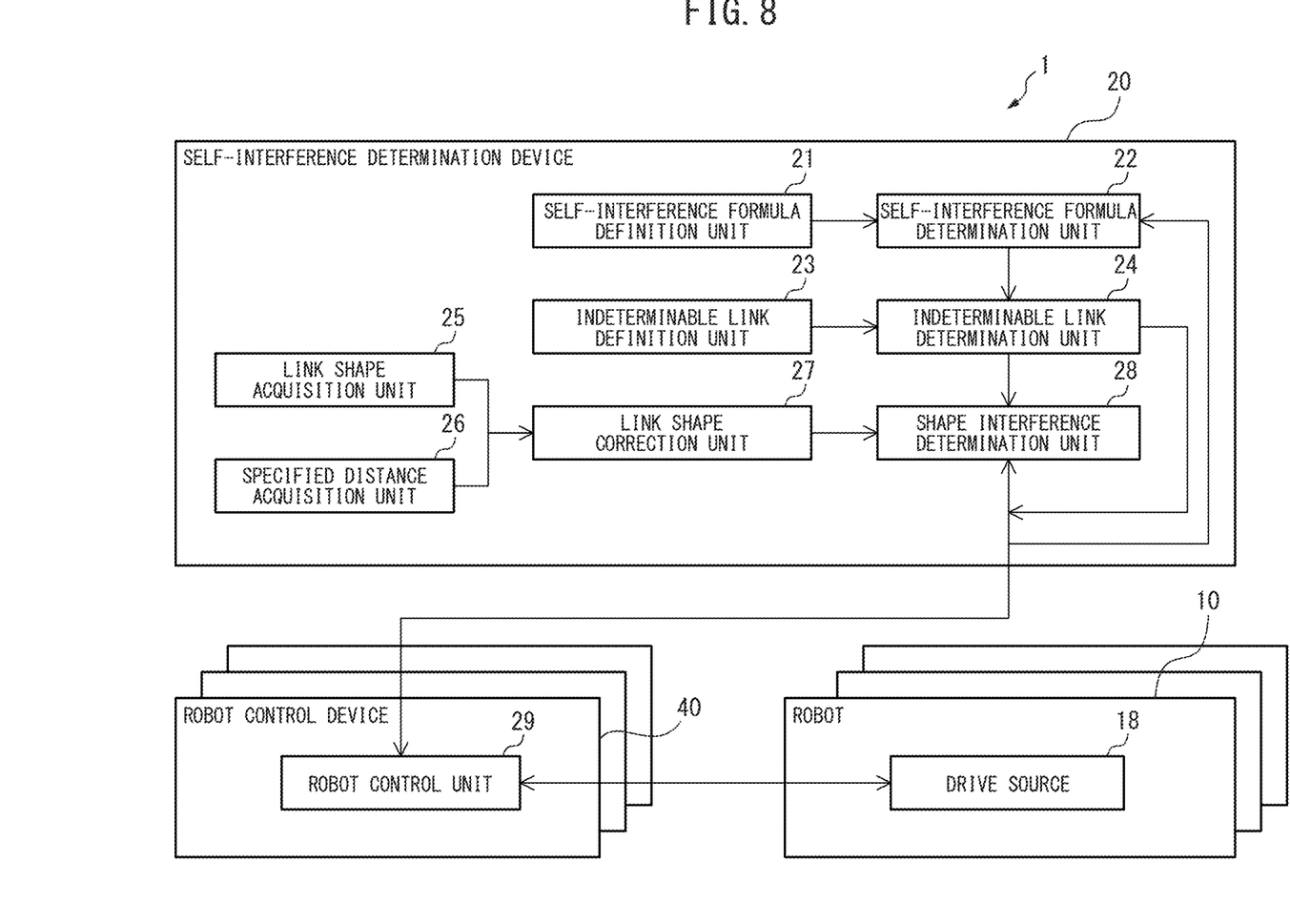
FIG. 8 is a functional block diagram of a robot system of another embodiment.

The self-interference determination device 20 described above may be configured not as a robot control device, but as a host computer device which transmits various commands to the robot control device. FIG. 8 is a functional block diagram of robot system 1 of another embodiment. The robot system 1 comprises one self-interference determination device 20, a plurality of robot control devices 40, and a plurality of robots 10. The current states of the links of each robot 10 (for example, the current positions or angles, velocities, etc.) are aggregated in the self-interference determination device 20 via each robot control device 40.

The self-interference determination device 20 performs self-interference formula determination (rough determination) and shape interference determination (detailed determination) based on the current states of the links of each robot 10 (the current positions or angles, velocities, etc.). When the self-interference determination device 20 determines that there is self-interference, it transmits, to each robot control device 40, a command to stop each robot 10. Each robot control device 40 stops the drive source 18 of the respective robot 10 based on the stop command.

Note that the configurations of the robot system 1 and the self-interference determination device 20 described above are examples, and other configurations can also be adopted. For example, the robot 10 may be other forms of robot such as a humanoid robot instead of an industrial robot. The robot 10 may apply shape interference determination to a robot having a plurality of parallel links (for example, a dual-arm robot) instead of a plurality of series links. The seventh link 17 of the robot 10 may be a tool part of another form such as a screwdriver, welding tool, or sealing tool instead of a hand.

The self-interference determination device 20 may comprise, instead of a processor which executes programs, integrated circuits which do not execute program (for example, an FPGA (field-programmable gate array), ASIC (application specific integrated circuit), etc.), and the integrated circuit may comprise the "units" depicted in FIG. 2. The flow charts depicted in FIGS. 6 and 7 may be executed by the integrated circuit instead of by the processor. The self-interference determination device 20 may have, instead of a hybrid determination function represented by the self-interference formula determination (rough determination) and shape interference determination (detailed determination), only the shape interference determination function.

For example, instead of enlarging the link shape of the fifth link 15, which is an indeterminable link by the specified distance, the link shape correction unit 27 may expand the link shape of the first link 11 or the second link 12, which has a possibility of self-interference with the fifth link 15. Alternatively, the link shape of the fifth link 15 and the link shape of the first link 11 or the second link 12 may be expanded within the specified distance. Likewise, when the specified distance is specified by a range, instead of simplifying the link shape of the fifth link 15, which is an indeterminable link so that, for example, it falls within the specified range, the link shape correction unit 27 may simplify the link shape of the first link 11 or the second link 12, which has a possibility of self-interference with the fifth link 15, or alternatively, may simplify the link shape of the fifth link 15 and the link shape of the first link 11 or the second link 12 within a specified range.

Note that the self-interference determination device 20 may comprise an interference determination unit which simply determines self-interference of an indeterminable link based on the position, angle, etc., of the other links, instead of performing shape interference determination, when self-interference can be determined by the position or angle of the other link if the links are considered to self-interfere based on the self-interference formula, even if one of these links is an indeterminable link for which the presence or absence of self-interference cannot be determined only from the position or angle of the link.

The programs executed by the processor or other integrated circuit described above or the programs for executing the flowcharts described above may be provided by being recorded on a computer-readable non-transitory recording medium such as a CD-ROM, or alternatively, may be distributed and provided via wire or wirelessly from a server device on a WAN (wide-area network) or LAN (local area network).

Though various embodiments have been described herein, it should be recognized that the present invention is not limited to the embodiments described above and various modifications can be made within the scope of the claims.

REFERENCE SIGNS LIST

1 Robot System
10 Robot
11 First Link
12 Second Link
13 Third Link
14 Fourth Link
15 Fifth Link
15a Enlarged Link Shape
15b Simplified Link Shape
16 Sixth Link
17 Seventh Link
18 Drive Source
13 To 14 Third/Fourth Link
15 To 17 Cylinder
20 Self-Interference Determination Device
21 Self-Interference Formula Definition Unit
22 Self-Interference Formula Determination Unit
23 Indeterminable Link Definition Unit
24 Indeterminable Link Determination Unit
25 Link Shape Acquisition Unit
26 Specified Distance Acquisition Unit
27 Link Shape Correction Unit
28 Shape Interference Determination Unit
29 Robot Control Unit
30, 31 Cylinder
32 Sphere
J1 To J6 Axis

The invention claimed is:

1. A self-interference determination device, comprising:
   a link shape correction unit configured to correct a link shape based on a specified distance between link shapes in which links of a robot comprising a plurality of links are considered to be a self-interference,
   a shape interference determination unit configured to determine a presence or absence of the self-interference based on the link shape, and
   a robot stoppage command unit configured to calculate a current minimum distance between the link shapes and a current relative velocity between the link shapes and to transmit a safe-stop command for safely stopping the robot based on the current minimum distance and the current relative velocity.

2. The self-interference determination device according to claim 1, wherein the link shape correction unit expands the link shape by the specified distance.

3. The self-interference determination device according to claim 1, wherein when the specified distance is specified by a range, the link shape correction unit simplifies the link shape so that the link shape fits within the specified range.

4. The self-interference determination device according to claim 1, further comprising a specified distance acquisition unit configured to acquire the specified distance.

5. The self-interference determination device according to claim 1, further comprising a link shape acquisition unit configured to acquire the link shape.

6. A self-interference determination device, comprising a shape interference determination unit configured to determine, for an indeterminable link for which a presence or absence of a self-interference cannot be determined from only a position or angle of a specified link of a robot comprising a plurality of links, regardless of the position or angle of links other than the specified link, the presence or absence of the self-interference based on whether or not link shapes approach each other within a specified distance.

7. The self-interference determination device according to claim 6, further comprising a specified distance acquisition unit configured to acquire the specified distance.

8. The self-interference determination device according to claim 6, further comprising a link shape acquisition unit configured to acquire the link shape.

9. The self-interference determination device according to claim 6, further comprising a robot stoppage command unit configured to calculate a current minimum distance between the link shapes and a current relative velocity between the link shapes and to transmit a safe-stop command for safely stopping the robot based on the minimum distance and the relative velocity.

10. A self-interference determination device, comprising:
   a self-interference formula definition unit configured to define a self-interference formula for determining a possibility of a self-interference of a robot comprising a plurality of links, and
   a self-interference formula determination unit configured to determine the possibility of the self-interference based on the self-interference formula, wherein
   the self-interference formula definition unit defines, for an indeterminable link for which a presence or absence of the self-interference cannot be determined from only a position or angle of a specified link regardless of the positions or angles of links other than the specified link, the self-interference formula based on a shape including a movable region of all links from the indeterminable link on a base side of the robot to the indeterminable link on a tip side of the robot.

11. The self-interference determination device according to claim 10, further comprising:
   an indeterminable link definition unit configured to define the indeterminable link for which there is a possibility of the self-interference, and
   an indeterminable link determination unit configured to determine whether or not the indeterminable link actually has a possibility of the self-interference.

12. A self-interference determination device for determining a self-interference of a first link and a second link, comprising:
   an indeterminable link determination unit configured to determine whether or not one of the first link and the second link is an indeterminable link for which a presence or absence of the self-interference cannot be determined from only a position or angle of the link when the first link and the second link are considered to be the self-interference, and
   an interference determination unit configured to determine the self-interference of the indeterminable link based on the determination results.

* * * * *